Patented June 29, 1937

2,085,533

UNITED STATES PATENT OFFICE 2,085,533

LUBRICATING GREASES

Edwin N. Klemgard, Martinez, Calif., assignor to Shell Development Company, San Francisco, Calif., a corporation of Delaware No Drawing. Application May 5, 1934, Serial No. 724,220

11 Claims. (Cl. 87—9)

This invention relates to the preparation of lubricating greases and is a continuation in part of my application, Serial No. 471,428, filed July 28, 1930. In the application I disclosed that by compounding with greases a certain amount of rubber latex it was possible to obtain a product of great stability, a very tenacious texture, and excellent qualities of adhesion to metallic surfaces, which product was therefore particularly adapted for use in conjunction with bearings carrying heavy loads or subjected to repeated shocks.

The present practice in the commercial manufacture of consistent lubricating greases is to produce various homogeneous mixtures and combinations of sodium, calcium, aluminum, zinc, or lead salts of the fatty acids with hydrocarbon oils. One of the greatest troubles attendant on mixtures so produced is their unstable character and the tendency of the metallic soap and oil components to separate.

I have found that the addition of small amounts of rubber latex tends, in all cases, to retard this deterioration of greases very greatly, and usually to stop it entirely. It must be especially pointed out here that the addition to greases of rubber latex, which is a milky liquid consisting of very minute rubber globules dispersed in a watery fluid, leads to entirely different effects from those obtained if ordinary cured or vulcanized rubber is dissolved in oil, as has been sometimes proposed in the prior art. The latex contains, besides water and rubber, minute but effective quantities of various constituents such as proteins and resinous materials, as well as anti-coagulants such as ammonia. These constituents are usually driven off and lost in the process of curing or vulcanizing the rubber, and the incorporation of solid redissolved rubber into the grease is practically ineffective, especially as it is difficult to obtain in that case a homogeneous mixing of the rubber with the grease, despite the involved and cumbersome methods used to that purpose. Latex containing from 30 to 50% by weight of rubber hydrocarbons is preferably used in this invention, although stronger or weaker natural aqueous dispersions of rubber may be employed.

In my application, Serial No. 471,428, I disclosed a process of producing improved lubricating greases by adding thereto small amounts of rubber latex and heating the mixture with a suitable agitation to a temperature sufficient to dehydrate the latex, whereby a product of transparent homogeneous texture is obtained.

I have now discovered that it is not necessary to effect the dehydration of the latex after it had been added to the grease, since the latex itself is added in relatively small quantities and the amount of water it contains does not effect unfavorably the lubricating properties of the grease, but on the contrary serves to improve them.

In carrying out my invention, I prefer to use a naphthenic base pale oil of about 300 seconds Saybolt viscosity at 100° F., although other viscous mineral oils, paraffinic as well as naphthenic may be used. This oil is mixed with a metallic soap of a fatty acid; calcium, sodium, aluminum, zinc and lead salts of any fatty acids of vegetable or animal origin, such as stearates, palmitates, oleates, etc., may be used for that purpose. Some glycerine derived from the fatty materials may also be added. The mixing may be effected by any accepted conventional method: for example, for the preparation of soda and lime base greases, reference may be had to my book on Lubricating Greases (The Chemical Catalog Co., Inc.). It may, however, be briefly remarked here, that when preparing soda and lime base greases, the soap in the form of a concentrated material, is placed at the beginning of the process in a compounding kettle, which may be of the steam jacketed type, and may be provided with means for mechanical agitation, the oil being thereafter added to the soap. When aluminum base greases are prepared, it is preferable to place first the oil in the mixing kettle, and to add the aluminum soap of a fatty acid afterwards. The mixture of oil and soap is heated with agitation to about 250° F., when naphthenic base oils are used, in order to dissolve the soap and obtain a satisfactory yield of a transparent homogeneous material. If, however, the percentage of the metallic soap is above about 15%, or if an oil of the paraffinic base is used, a treating temperature up to about 350° F. may be necessary. When a satisfactory homogeneous material is obtained, further heating is discontinued and the emulsion is cooled to a suitably low temperature, such, for example, as about 200° F., so that substantially no evaporation of water from latex will take place upon its addition. Rubber latex is then added and owing to its structure and character described above, it is readily incorporated in the emulsion by mechanical agitation. After the rubber latex has been thoroughly dissolved in the grease, the mass is further cooled, either before or after being discharged from the mixer.

Depending on the kind of greases which it is desired to manufacture, the amounts of the ingredients used in my process may vary between comparatively wide limits, starting with less than about 1% of metallic soap and about 0.1% of rubber latex and ending with about 60% of alkali or metallic soap and 6% of rubber latex for very dense greases. In all cases, however, the product obtained is a lubricating grease of semi-solid consistency, containing as its three essential ingredients a mineral oil, a metallic alkali soap of a fatty acid, and non-dehydrated rubber latex.

I have found that through the addition of the latter substance a very stable gel structure is formed that is very resistant to separation usually caused by mechanical working or agitation. The stability of the product makes it eminently suitable as lubricant for gears, wheels, ball roller bearings and shackle bolts. The superiority of the greases compounded according to my invention over the products heretofore available on the market may be easily demonstrated by a number of tests. For example, in making stability tests, I experimented extensively with greases of the following composition.

*Example I*

| Mixture | A | B |
|---|---|---|
| Percent 300 pale oil | 90.5 | 90.0 |
| Percent aluminum stearate | 9.5 | 9.5 |
| Percent rubber latex | 0 | 0.5 |

*Example II*

| Mixture | A | B |
|---|---|---|
| Tallow | 5.9 | 5.9 |
| Caustic soda | 0.9 | 0.9 |
| California red oil (1000 S. V. vis. 100° F.) | 12.3 | 12.3 |
| Calif. bright stock (150 S. V. vis. 210° F.) | 19.5 | 19.5 |
| Mid-Continent steam refined cylinder stock | 61.4 | 61.3 |
| Rubber latex | 0 | 0.3 |

The grease containing the rubber latex was found in both examples to be considerably more stable under all conditions. Both Mixtures A and B were subjected to prolonged mechanical agitation after which they were very carefully examined with the following results: Mixture A showed positive separation and signs of breaking down, while the texture of Mixture B was practically unchanged. After continuous standing for a considerable period of time without agitation, a sample of the grease containing rubber latex showed no oil separation, while free oil was quite perceptible in the sample containing no rubber latex.

I claim as my invention:

1. In the process of manufacturing lubricating grease, the steps of mixing a hydrocarbon oil with a metallic soap of a fatty acid derived from vegetable oils or fats, heating the mixture with agitation to a temperature between 150° and 500° F. to form grease, cooling the grease to a temperature below about 200° F., and incorporating a small quantity of non-dehydrated rubber latex into the said cooled grease.

2. In the process of claim 1, using from 0.1 to 6.0% of rubber latex.

3. In the process of manufacturing lubricating grease, the steps of mixing a mineral oil with less than 15% of a metallic soap of a fatty acid derived from vegetable oils or fats, heating the mixture with suitable agitation to a temperature between 150° and 250° F., to form grease, cooling the grease to a temperature below 200° F., and incorporating with said cooled grease less than 6% of non-dehydrated rubber latex.

4. A lubricating grease comprising a hydrocarbon oil, a metallic soap of a fatty acid derived from vegetable oils or fats in a quantity sufficient to give the compound the consistency of a grease, and a small quantity of a non-dehydrated rubber latex.

5. The composition of claim 4, containing less than about 60% metallic soap of a fatty acid derived from vegetable oils or fats and less than about 5% non-dehydrated rubber latex.

6. The composition of claim 4, containing less than about 15% metallic soap of a fatty acid derived from vegetable oils or fats and less than 5% non-dehydrated rubber latex.

7. The composition of claim 4, containing less than about 15% aluminum soap of a fatty acid derived from vegetable oils or fats and less than about 0.5% non-dehydrated rubber latex.

8. A lubricating grease comprising a hydrocarbon oil, a quantity of metallic soap obtained by saponifying a soap-forming material, said quantity being sufficient to give the compound the consistency of a grease, and a small quantity of a non-dehydrated rubber latex.

9. A lubricating grease comprising a hydrocarbon oil, a small quantity of glycerine, a quantity of metallic soap obtained by saponifying a soap-forming material, said quantity being sufficient to give the compound the consistency of a grease, and a small quantity of a non-dehydrated rubber latex.

10. A lubricating grease comprising a viscous hydrocarbon oil, a metallic soap of a soap-forming acid in a quantity sufficient to give the compound the consistency of a grease, and a small quantity of a non-dehydrated rubber latex.

11. A lubricating grease comprising a hydrocarbon oil, a quantity of metallic soap obtained by saponifying a fatty material, said quantity being sufficient to give the compound the consistency of a grease, and a small quantity of a non-dehydrated rubber latex comprising rubber and water in a ratio substantially corresponding to that of a natural latex.

EDWIN N. KLEMGARD.